United States Patent
Parekh et al.

(10) Patent No.: US 10,689,940 B2
(45) Date of Patent: Jun. 23, 2020

(54) ELEMENT

(71) Applicants: Yash Parekh, Houston, TX (US);
YingQing Xu, Tomball, TX (US);
Ronnie Russell, Cypress, TX (US);
Barbara Pratt, Pearland, TX (US)

(72) Inventors: Yash Parekh, Houston, TX (US);
YingQing Xu, Tomball, TX (US);
Ronnie Russell, Cypress, TX (US);
Barbara Pratt, Pearland, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 15/955,265

(22) Filed: Apr. 17, 2018

(65) Prior Publication Data

US 2019/0316438 A1    Oct. 17, 2019

(51) Int. Cl.
*E21B 33/12* (2006.01)
*E21B 33/134* (2006.01)
*F16J 15/18* (2006.01)
*F16L 55/11* (2006.01)

(52) U.S. Cl.
CPC .......... *E21B 33/1208* (2013.01); *E21B 33/12* (2013.01); *E21B 33/134* (2013.01); *F16J 15/18* (2013.01); *F16L 55/11* (2013.01)

(58) Field of Classification Search
CPC .. E21B 33/12; E21B 33/1204; E21B 33/1208; E21B 33/134; F16J 15/18; F16J 15/183; F16L 23/16; F16L 55/11
See application file for complete search history.

(56) References Cited

U.S. PATENT DOCUMENTS

| | | | | |
|---|---|---|---|---|
| 2,230,712 A | * | 2/1941 | Bendeler | E21B 33/128 166/123 |
| 2,315,921 A | * | 4/1943 | Baker | E21B 33/12 166/125 |
| 5,355,961 A | * | 10/1994 | Gariepy | E21B 33/04 166/182 |
| 8,496,052 B2 | | 7/2013 | Frazier | |
| 8,997,853 B2 | | 4/2015 | Vanlue | |
| 9,835,003 B2 | | 12/2017 | Harris et al. | |
| 2004/0026876 A1 | * | 2/2004 | Prinz | F04D 29/106 277/628 |
| 2016/0312555 A1 | | 10/2016 | Xu et al. | |

FOREIGN PATENT DOCUMENTS

WO      03002847 A1    1/2003

OTHER PUBLICATIONS

Baker Hughes SC-2 Packer; Product Family H48807; Global-Completions and Production Tech Unit Sand Control Tools, Gravel Pack and Frac Pack Packers TU 5632; Jun. 5, 2016; 18 pp.

(Continued)

*Primary Examiner* — Cathleen R Hutchins
(74) *Attorney, Agent, or Firm* — Cantor Colburn LLP

(57) ABSTRACT

An element including an undercut in the element extending from an innermost surface of the element radially outwardly into the element, and a pathway intersecting the undercut and extending from the undercut to an outermost surface of the element, the pathway fluidly connecting the outermost surface of the element to the undercut prior to setting of the seal.

7 Claims, 2 Drawing Sheets

(56) References Cited

OTHER PUBLICATIONS

Baker Hughes, a GE Company; New SC-1AR Packer, Product Family H48865; L3-Instruction/T1-Global Tech Unit; Sand Control Tools TU 5767, Jul. 1, 2011; 10 pp.
Notification of Transmittal of the International Search Report and the Written Opinion of the International Searching Authority, or the Declaration; PCT/US2019-0727693; dated Aug. 5, 2019; 12 total pages.

* cited by examiner

ELEMENT

BACKGROUND

In the resource recovery industry seals are used for many different duties. Some seals are used to occlude or reduce flow in an annular space between a borehole tool and a casing or open hole. These can be for setting the tool temporarily or permanently in a way to prevent all annular flow or can be used to reduce a radial dimension of the annulus about the tool to a smaller measurement for such things as conveying tools to their intended destination using fluid flow past the tool. This is the case in such tools as fracture plugs and liners, for example, and especially in highly deviated or horizontal wells. While the practice of flowing tools to target is common place, and regularly successful, it is also measurably subject to failures in the form of swab offs of the seal and consequent reduction in efficiency or failure of utility of the particular tool when flow rates exceed a value of about 8 BBL per minute. Higher flow rates are desirable to reduce transit time to target but with increasing flow rate there is an increasing failure rate. In view hereof, the art would welcome alternative constructions that improve reliability and reduce cost.

SUMMARY

An element including an undercut in the element extending from an innermost surface of the element radially outwardly into the element, and a pathway intersecting the undercut and extending from the undercut to an outermost surface of the element, the pathway fluidly connecting the outermost surface of the element to the undercut prior to setting of the seal.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
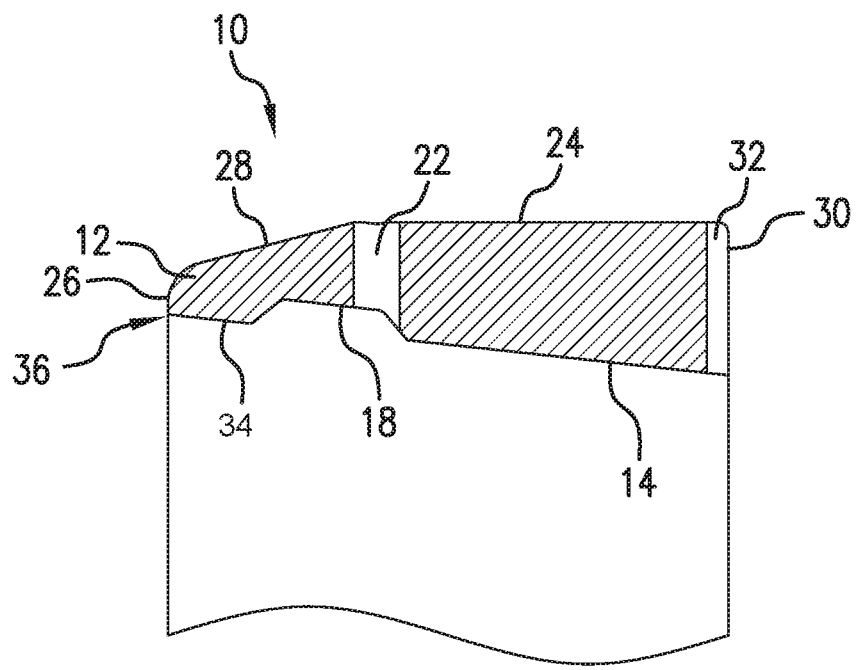
FIG. 1 is a cross sectional view of a seal element as disclosed herein.
Figure 2:
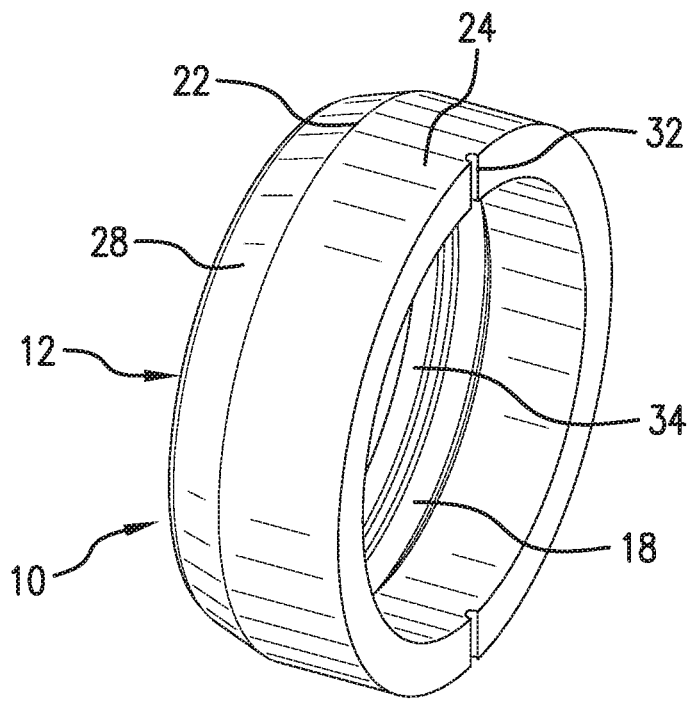
FIG. 2 is a perspective view of the seal element of FIG. 1.

Referring to FIG. 1 a seal element 10 as disclosed herein is of a swab resistant construction. The element 10 includes a lip 12. In the illustrated embodiment, the element 10 has a frustoconical inside surface 14 configured to cooperate with a frustoconical member 16 (see FIG. 3). Noticeable at the inside surface 14 is an undercut 18 that will leave an annular space 20 defined by the element 10 and the frustocone 16 when installed. The undercut 18 is intersected by a number of pathways 22 extending from undercut 18 to an outside surface 24 of element 10. When installed on a frustocone 16, the pathways 22 provide a fluid pathway from the outside surface 24 to the annular space 20, which is important to swab resistance discussed hereunder. Between a leading edge 26 of the lip 12 and the number of pathways 22, which if multiple, are arranged in an annular pattern about the element 10, is a ramp 28 of element 10. Between the number of pathways 22 and a trailing edge 30 of element 10, surface 24 is cylindrical in an embodiment. Finally a fluid path 32 is defined at the trailing edge 30 (in, on or around), which fluid path 32 may be radial or otherwise providing it provides a fluid pathway between a volume in contact with surface 24 and a volume under an adjacent backup ring 36 (See FIG. 3), which helps reduce or prevent damage to the backup ring 36. Finally, a lip undersurface 34 is in some embodiments dimensioned to provide a tight fit with a frustocone 16 with which it will used. By "tight fit" it is meant an interference fit to reduce or eliminate a fluid pathway between the element 10 and the frustocone 16. Element 10 may be constructed of material having 5% or more elongation. Some examples of suitable materials include but are not limited to rubber, plastic, elastomers, polymers, soft metals, etc.

The undercut 18 may be fully annular or may be part annular or may be in short portions that together define an annular form . . . like a dashed line wherein the dashes are undercuts. In each case, if the undercut is intended to provide for low pressure communication from the outside of the element to the annular space 20 (or part annular or dashed annular) then for each portion of the undercut that is to be so provided, a pathway 22 must extend to that undercut. Low pressure will not be communicated to the undercut without a pathway to the fluid flow area outside of the element 10.

The features of element 10 work together to dramatically improve swab off resistance to flow rates past the seal of 15 BBls per minute or even higher. The lip 12 ensures a low differential pressure at a nose 36 of element 10 as fluid flows therepast. At the same time, the undersurface 34 prevents high pressure fluid from reaching undercut 18 and surface 14 of element 10. In addition, pathways 22 allow low pressure found in a fluid passing over surfaces 22 and 24 (which obviously is in an annulus between the tool and a tubular within which the tool is being run) to be communicated automatically to the annular space 20, which tends to suck the element onto the frustocone 16 rather than allow it to be swabbed off due to the low pressure pulling the element 10 away from the frustocone 16.

Figure 3:
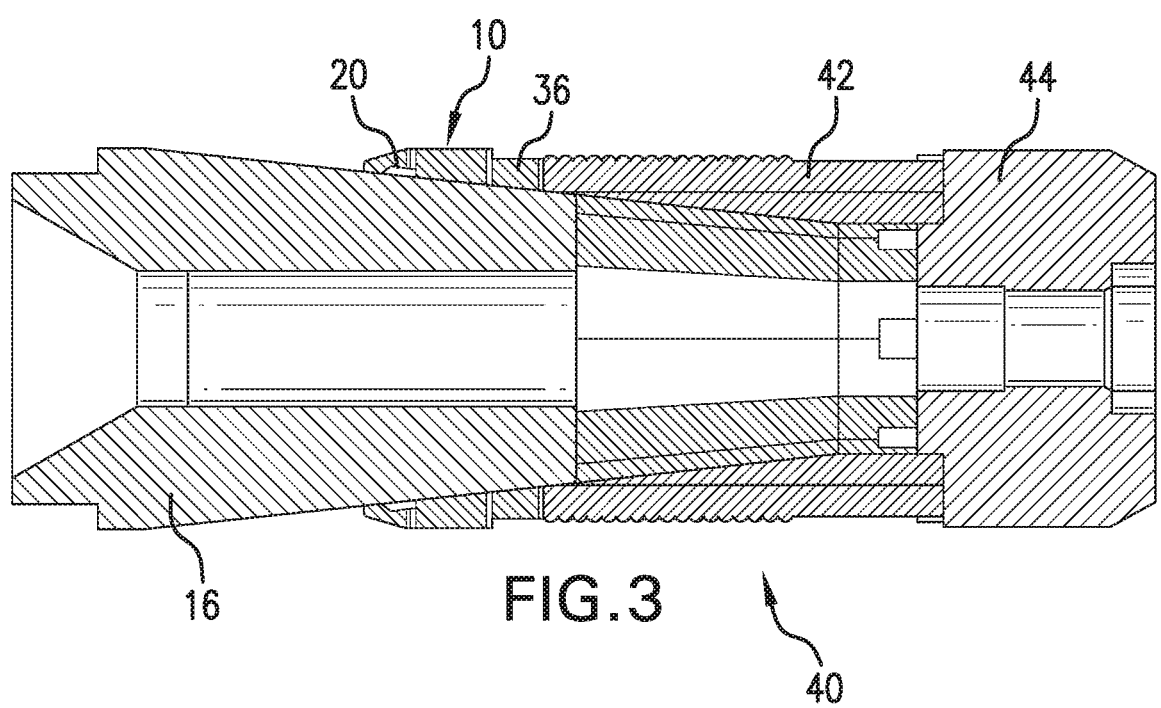
FIG. 3 is a cross sectional view of a fracture plug employing the seal element of FIG. 1.

Referring to FIG. 3, a fracture plug 40 is illustrated that employs the element 10. The element 10 and backup 36 are disposed on the frustocone 16. The backup 36 is abutted by a slip 42, which in turn is abutted by a pusher 44. It will be understood that the seal element 10, backup 36 and slip 42 are pushed from a relatively narrower end of the frustocone 16 to a relatively larger end of frustocone 16 by displacement of the pusher 44 and the frustocone 16 relatively toward each other. It is to be understood that while a fracture plug has been used as an example of the use of the seal element 10 disclosed herein, the application of the element 10 is broader. It is to be recognized that the element 10 is also suitable for use in any other downhole tool that requires sealing or fluid flow inhibition and due to the design is applicable to tools that are subject to high flow rates of fluids therepast in the downhole environment. This includes for example liner hangers where the liner top packer is subject to high fluid flow rates therepast.

Set forth below are some embodiments of the foregoing disclosure:

Embodiment 1: An element including an undercut in the element extending from an innermost surface of the element radially outwardly into the element, and a pathway intersecting the undercut and extending from the undercut to an outermost surface of the element, the pathway fluidly connecting the outermost surface of the element to the undercut prior to setting of the seal.

Embodiment 2: The element as in any prior embodiment, further comprising a lip that is dimensioned to be 0.1% to 70% of the radial thickness of a remainder of the element.

Embodiment 3: The element as in any prior embodiment, wherein the lip includes an undersurface that creates a fluid tight fit with a separate component.

Embodiment 4: The element as in any prior embodiment, further comprising a ramp extending from the lip to an outside surface of the element, the undercut being at least partially located radially inwardly of the ramp.

Embodiment 5: The element as in any prior embodiment, wherein the undercut is fully annular.

Embodiment 6: The element as in any prior embodiment, wherein the undercut is part annular.

Embodiment 7: The element as in any prior embodiment, wherein the pathway is a plurality of pathways.

Embodiment 8: The element as in any prior embodiment, further including a fluid path at a trailing end of the element.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A seal comprising:
    an element having a frustoconical inside surface extending from one axial end of the element to the other axial end of the element, an outside surface of the element, a lip at a leading end of the element and a ramp extending from the lip to the outside surface;
    an undercut in the element extending through the frustoconical inside surface of the element radially outwardly into the element, the frustoconical surface continuing on both axial ends of the undercut at least partially longitudinally overlapping the ramp; and
    a pathway intersecting the undercut and extending from the undercut to an outermost surface of the element, the pathway fluidly connecting the outermost surface of the element to the undercut prior to setting of the seal.

2. The seal as claimed in claim 1 wherein the lip is dimensioned to be 0.1% to 70% of the radial thickness of a remainder of the element.

3. The seal as claimed in claim 1 wherein the lip includes an undersurface that creates a fluid tight fit with a separate component.

4. The seal as claimed in claim 1 wherein the undercut is fully annular.

5. The seal as claimed in claim 1 wherein the undercut is partially annular.

6. The seal as claimed in claim 1 wherein the pathway is a plurality of pathways.

7. A seal comprising:
    an element having a frustoconical inside surface extending from one axial end of the element to the other axial end of the element;
    an undercut in the element extending through the frustoconical inside surface of the element radially outwardly into the element, the frustoconical surface continuing on both axial ends of the undercut;
    a pathway intersecting the undercut and extending from the undercut to an outermost surface of the element, the pathway fluidly connecting the outermost surface of the element, to t undercut prior to setting of the seal; and
    a fluid path at a trailing end of the element extending from the frustoconical inside surface to the outermost surface.

* * * * *